United States Patent [19]
Kutnyak et al.

[11] Patent Number: 4,547,029
[45] Date of Patent: Oct. 15, 1985

[54] SELF-LOCKING ELECTRICAL AND MECHANICAL CONNECTING MEANS AND METHOD OF MAKING SAME

[75] Inventors: Thomas A. Kutnyak, Tucson, Ariz.; Thomas W. Tolbert, Greenwood, S.C.

[73] Assignee: Automation Industries, Inc., Greenwich, Conn.

[21] Appl. No.: 662,586

[22] Filed: Oct. 19, 1984

Related U.S. Application Data

[63] Continuation-in-part of Ser. No. 543,889, Oct. 20, 1983, abandoned.

[51] Int. Cl.⁴ ............................................. H01R 11/08
[52] U.S. Cl. ................................. 339/16 R; 339/276 T
[58] Field of Search ............ 339/15, 16, 276 R, 276 T

[56] References Cited

U.S. PATENT DOCUMENTS

| 3,127,227 | 3/1964 | Edwards | 339/15 |
| 3,614,716 | 10/1971 | Jensik | 339/276 R |
| 4,063,790 | 12/1977 | Kleylamp et al. | 339/16 R |
| 4,094,535 | 6/1978 | Minton | 339/15 |

FOREIGN PATENT DOCUMENTS 411899 4/1925 Fed. Rep. of Germany ... 339/276 R

Primary Examiner—Joseph H. McGlynn
Attorney, Agent, or Firm—Thomas L. Flattery

[57] ABSTRACT

A self-locking electrical and mechanical connecting means and method between a helical curved end-portion of a self-supporting resilient, electrical wire-helix of a certain radius and a nominally straight-axis, metal socket-portion of an electrical terminal characterized in that the socket is plastically deformed to self-lock onto the elastically deformed and somewhat straightened wire-helix end-portion.

12 Claims, 7 Drawing Figures

SELF-LOCKING ELECTRICAL AND MECHANICAL CONNECTING MEANS AND METHOD OF MAKING SAME

Cross-Reference to Related Application

This application is a continuation-in-part of copending application Serial No. 06/543,889 filed Oct. 20, 1983 by Thomas A. Kutnyak, now abandoned.

BACKGROUND OF THE INVENTION

Wire-reinforced, flexible hose is in common use in vacuum cleaner devices wherein an electrically operated component such as a brush at the remote end of the hose receives its power through the hose wall. The helical reinforcing wire serves both as an electrical conductor and as a structural member in such hoses. Two, parallel, helical wires are commonly employed, each insulated with plastic and a multiple ply wall of flexible plastic is disposed about the wire-convolutions.

Molded plastic end-fittings are typically located at each end of such a wire-reinforced, flexible hose for connection to other components of the vacuum cleaner device. U.S. Pat. No. 3,636,285 illustrates typical terminals which are embedded within the plastic end-fitting and serve to establish an electrical and mechanical connection between the exposed end of the wire-helix and the next component of the electrical circuit.

The prior art method of making this connection has been to straighten the wire-helix and then force-fit a socket to the terminal over the straightened wire. This is a labor-intensive operation and requires special attachments on the stripping-bending apparatus in order to handle hoses of different diameters. One disadvantage of the prior art practice is that the terminals frequently slide off the pre-straightened portions of the wire during the molding operation in which the terminal is embedded in the end-fitting wall.

It is the principal purpose of the present invention to provide a method and means for forming such connections wherein the terminal is resiliently self-locked onto the wire end-portion at the outset and will not inadvertently dislodge from the wire during the molding operation.

SUMMARY OF THE INVENTION

Self-locking electrical and mechanical connecting means are provided in accordance with the invention between a nominally helical, curved end-portion of a self-supporting, resilient, electrical wire-helix of a certain radius and an open-ended, nominally straight-axis, extended, plastically deformable, metal socket-portion of an electrical terminal. A wall defines the socket-portion and is plastically deformed tightly about the curved wire end-portion. The curved wire end-portion within that socket-wall is elastically deformed into a straighter configuration of a radius greater than said certain radius and the socket-portion is plastically deformed to the configuration of the wire. In this manner the plastically deformed socket-portion is self-locked onto the elastically deformed, wire end-portion to form a resilient electrical and mechanical connection therebetween.

The invention also provides a method of elastically and mechanically connecting a helical curved end-portion of a self-locking, resilient, metal, electrical wire-helix of a certain radius to an open-ended, nominally straight-axis, extended, plastically deformable, metal socket-portion of an electrical terminal. In accordance with the method the curved, wire-helix end-portion is inserted into the nominally straight-axis socket-portion of the terminal. The socket-portion is then radially compressed into contact with the wire-helix end-portion. The socket-portion is then further compressed and plastically deformed to elastically deform the wire end-portion therewithin into a straighter configuration of a radius greater than the certain radius and to plastically deform the socket-portion to the configuration of the wire. As a consequence of these steps the plastically deformed socket-portion self-locks onto the elastically deformed, wire end-portion to form a resilient electrical and mechanical connection therebetween.

DESCRIPTION OF PREFERRED EMBODIMENT

Figure 1:
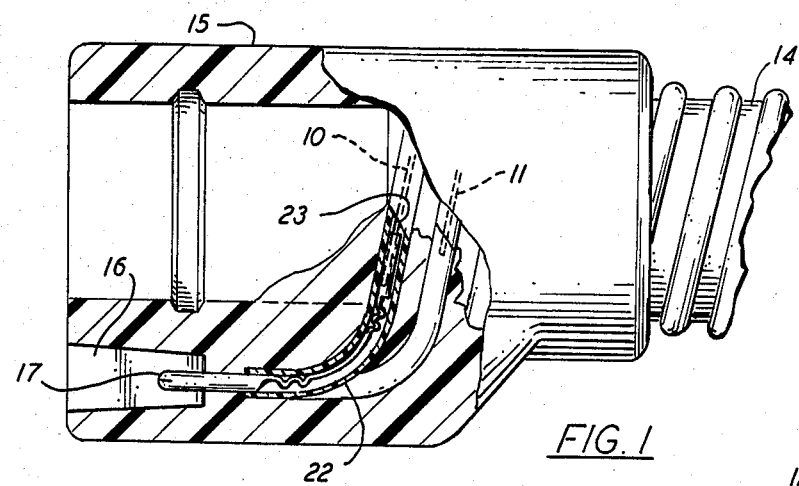
FIG. 1 is a fragmentary elevation partly in section of an end-fitting and a wire-reinforced, electrically conductive hose with terminals in accordance with the invention.

Referring first to FIG. 1 a pair of metal wires 10 and 11 of round cross-section are formed in double-lead fashion to provide reinforcement in the hose wall. Each wire preferably has a steel core and a copper coating in typical diameters from 0.048" to 0.062". The copper content of such wires is usually between 10 and 35 percent by weight. The function of the pair of wires in the finished product is to provide a flexible, self-supporting skeleton for the hose and at the same time provide a pair of electrical conductors which can carry current to the end of the hose.

The wires 10 and 11 are coated with concentric layers of vinyl plastic 12 and 13 respectively (see FIGS. 5 and 6) the thickness of which is in the order of 0.032". This plastic coating provides a bondable surface about which the body of the hose is formed and also provides electrical insulation. In a conventional manner a hose-wall 14 is formed about the wire-helices 10 and 11. One or more plastic strips are wrapped helically about the double wires with overlapping turns bonded together to form the hose-wall.

Figure 7:
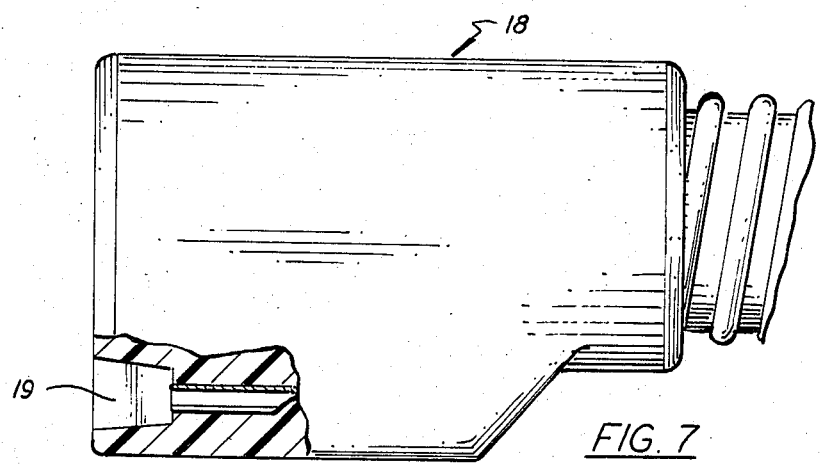
FIG. 7 illustrates a hose end-fitting adapted for use with a male electrical component.

An end-fitting 15 of plastic compatible with the hose-wall 14 is injection-molded about the end of the hose as shown in FIG. 1. The fitting defines a socket 16 into which the female connector of an electrical cord may be inserted to make contact with electrical connectors 17. In FIG. 7 a similar end-fitting 18 is shown defining a socket 19 adapted for a male-type connector. Otherwise the end-fitting embodiments of FIGS. 1 and 7 are similar.

An electrical terminal 20 in accordance with the invention is provided for making an electrical and mechanical connection with the exposed end-portion of the wire-helix. There is one such terminal 20 for each of the two wire-helices 10 and 11 and that terminal associated with the wire-helix 10 is shown in detail in FIGS. 2 and 6. The terminal 20 is surrounded by a flexible, plastic, insulating tube 22. This tube may be of polyvinyl chloride or polyurethane and extends one-eighth to three-sixteenths of an inch beyond each end of the terminal 20. It may be cut at an angle as shown at 23 in FIG. 1 where it surrounds the connection between terminal 20 and the exposed end of the wire 10.

Figure 2:
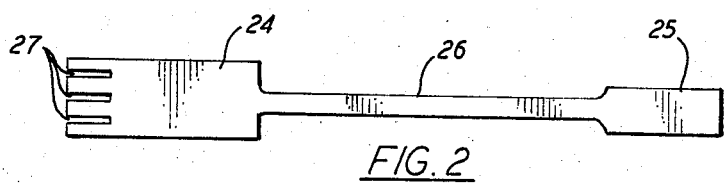
FIG. 2 is a plan view of a metal stock in its initial configuration during manufacture of the end-terminal of the invention.
Figure 3:
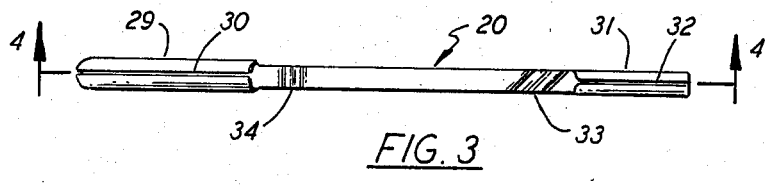
FIG. 3 is a plan view of the formed terminal ready for use in an end-fitting.
Figure 4:
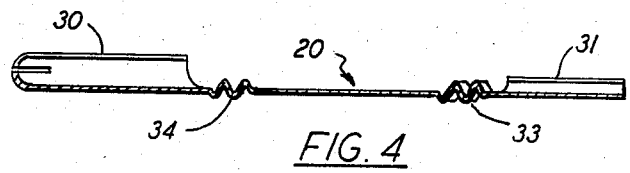
FIG. 4 is a longitudinal section taken along the line 5—5 of FIG. 4.

The formation of the terminal 20 is described in relation to FIGS. 2 to 4. Flat, brass stock is cut into the pattern shown in FIG. 2, with a wide end-portion 24 connected to a less wide opposite end-portion 25 by means of a narrower central strap-portion 26. The first-mentioned wide end-portion 24 has a plurality of parallel slots 27 formed in its outer end.

As shown in FIG. 3 the end-portions 24 and 25 are turned into substantially cylindrical shape. A male prong 29 is formed by the wider end portion 24 with a longitudinal slot 30 throughout its length. The slots 27 permit the outer end of the prong 29 to be crimped into a rounded shape as shown in FIGS. 3 and 4 to form one of the male connectors 17. A socket 31 also with a longitudinal slot 32 is formed by the narrower end-portion 25. The socket 31 comprises an open-ended, straight-axis, extended, plastically deformabled, metal socket.

Angled corrugations 33 may be formed in the central strap-portion 26 of the terminal adjacent the socket 31 approximately 45° to its centerline and straight-across corrugations 34 may be formed in the strap-portion adjacent the prong 29 approximately perpendicular to the centerline. These corrugations give optimum flexibility to the terminal so that it can be bent into the shape shown in FIG. 1.

Figure 5:
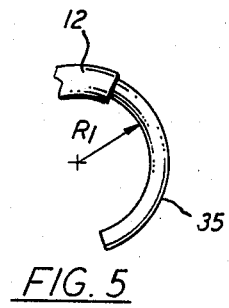
FIG. 5 is an enlarged fragmentary view showing the initial curved end-portion of the wire-helix with the curve exaggerated.
Figure 6:
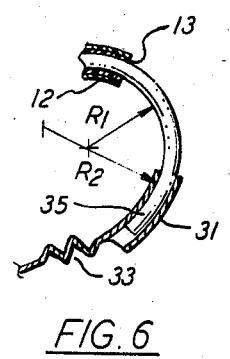
FIG. 6 is an enlarged fragmentary view similar to FIG. 5 showing the terminal socket-portion fitted onto the somewhat straightened wire end-portion.

FIGS. 5 and 6 show an end-portion 35 of the wire 10 in its original shape with the curve exaggerated for purposes of clarity. The radius of this initial curve is designated R-1. In the practice of the invention the curved-wire end-portion 35 is inserted into the nominally straight-axis socket 31 while the socket 31 is positioned within the tubular cavity of a supporting tool loosely surrounding it but preventing it from being freely straightened to conform to the R-1 curve of the wire end-portion 35. This tool may be in matching halves for easy release when the operation is complete. The socket 31 is radially compressed into contact with the end-portion 35 and then further compressed and plastically deformed to elastically deform the wire end-portion 35 into a straighter configuration of a radius R-2 shown in FIG. 6 greater than the radius R-1. The slot 30 may open slightly during these compression-steps. With the terminal socket-portion 31 plastically deformed and the wire end-portion 35 elastically deformed there is a leaf-spring action of the wire end-portion 35 within the socket-portion 31 to hold the two resiliently together.

The insulating tube 22 is slipped over the terminal so that its angled end 23 abuts up to and slightly over the insulation 12-13 on the wire 10. By suitable bends introduced into the corrugations 33 and 34 the terminal is directed into the configuration shown in FIG. 1 and the plastic end-fitting 15 is injection-molded about the assembly.

In this manner the plastically deformed socket-portion 31 self-locks onto the elastically deformed, straightened, wire end-portion 35 to form a resilient electrical and mechanical connection therebetween. This connection insures that the terminal 20 will not slide accidentally off the end-portion 35 of the wire 10 during manipulation of the parts prior to the end-fitting molding-operation.

The scope of the invention is not to be limited to the specific embodiment herein described but rather to the following claims.

We claim:

1. Self-locking electrical and mechanical connecting means between a nominally helical curved end-portion of a self-supporting resilient metal electrical wire-helix of a certain radius and an open-ended nominally straight-axis extended plastically deformable metal socket-portion of an electrical terminal comprising
    (a) a wall defining said socket-portion and being plastically deformed tightly about the curved wire end-portion,
    (b) said curved wire end-portion within the socket-wall being elastically deformed into a straighter configuration of a radius greater than said certain radius and the socket-portion being plastically deformed to said configuration of the wire, and
    (c) whereby the plastically deformed socket-portion is self-locked onto the elastically deformed end-portion to form a resilient electrical and mechanical connection therebetween.

2. Self-locking electrical and mechanical connecting means according to claim 1 wherein the wire and socket are of round cross-section.

3. Self-locking electrical and mechanical connecting means according to claim 1 wherein the socket-wall is split longitudinally to expand in force-fit relation upon insertion of the wire end-portion.

4. Self-locking electrical and mechanical connecting means according to claim 1 wherein the socket-wall is of thin metal stock.

5. Self-locking electrical and mechanical connecting means according to claim 1 wherein the electrical terminal further includes second electrical connecting means.

6. Self-locking electrical and mechanical connecting means according to claim 1 wherein a central flat strap-portion of the terminal joins the second connecting means and the socket-portion and corrugations are formed in the strap-portion.

7. Self-locking electrical and mechanical connecting means according to claim 1 wherein the terminal is embedded in a plastic end-fitting on a flexible hose within which the wire-helix is a reinforcing and current-carrying element.

8. Self-locking electrical and mechanical connecting means according to claim 1 wherein the terminal is surrounded by an individual insulating tube.

9. Self-locking electrical and mechanical connecting means between a nominally helical curved end-portion of a self-supporting resilient metal electrical wire-helix of a certain radius and a round cross-section and an open-ended nominally straight-axis extended plastically deformable metal socket-portion of an electrical terminal of corresponding round cross section, the terminal being embedded in a plastic end-fitting on a flexible hose within which the wire-helix is a reinforcing and current-carrying element, the electrical terminal further including second, electrical connecting-means, comprising (a) a wall of thin metal stock defining said socket-portion and being plastically deformed tightly about the curved wire end-portion,
(b) the socket-wall being split longitudinally throughout its length to expand in force-fit relation upon insertion of the wire end-portion,
(c) a central flat strap-portion of the terminal joining the second electrical connecting means and the socket-portion with corrugations formed in the strap-portion,
(d) said curved wire end-portion within the socket-wall being elastically deformed into a straighter configuration of a radius greater than said certain radius and the socket-portion being plastically deformed to said configuration of the wire,
(e) an individual insulating tube surrounding the socket-portion of the terminal,
(f) whereby the plastically deformable socket-portion is self-locked onto the elastically deformed end-portion to form a resilient electrical and mechanical connection therebetween.

10. A method of electrically and mechanically connecting a helical curved end-portion of a self-locking resilient metal electrical wire-helix of a certain radius to an open-ended nominally straight-axis extended plastically deformable metal socket-portion of an electrical terminal which comprises
(a) inserting the curved wire-helix end-portion into the nominally straight-axis socket,
(b) radially compressing the socket into contact with the wire-helix end portion, and
(c) further compressing and deforming the socket to elastically deform the wire end-portion therewithin into a straighter configuration of a radius greater than said certain radius and to plastically deform the socket-portion to said configuration of the wire,
(d) whereby the plastically deformed socket self-locks onto the elastically deformed wire end-portion to form a resilient electrical and mechanical connection therebetween.

11. A method according to claim 10 wherein the inserting of the wire-helix end-portion is a force-fit which expands the socket.

12. A method according to claim 10 wherein the wire and socket are of round cross-section.

* * * * *